United States Patent [19]
Watanabe et al.

[11] 3,854,086
[45] Dec. 10, 1974

[54] NON-LINEAR FLUX DETECTION DEVICE UTILIZING MAGNETIC THIN FILM

[75] Inventors: Teruji Watanabe, Niiza; Takasuke Fukui, Tokyo; Minoru Higurashi, Yokohama; Takao Sugisaki, Ichikawa; Tatsushiro Ochiai, Matsudo, all of Japan

[73] Assignees: Kokusai Denshin Denwa Co., Ltd.; TDK Electronics Co., Ltd., both of Tokyo, Japan

[22] Filed: May 24, 1972

[21] Appl. No.: 256,329

[30] Foreign Application Priority Data

May 31, 1971 Japan................................ 46-37590

[52] U.S. Cl............................ 324/43 R, 324/34 PS
[51] Int. Cl............................................ G01r 33/02
[58] Field of Search ................. 324/43 R, 47, 34 PS

[56] References Cited
UNITED STATES PATENTS

| 3,012,177 | 12/1961 | Mortimer.......................... 324/43 R |
| 3,239,754 | 3/1966 | Odom, Jr. et al..................... 324/47 |
| 3,400,328 | 9/1968 | Penn et al......................... 324/43 R |
| 3,657,641 | 4/1972 | Kardashian ....................... 324/43 R |
| 3,662,257 | 5/1972 | Fujiwara......................... 324/34 PS |

FOREIGN PATENTS OR APPLICATIONS 592,241 9/1947 Great Britain .................... 324/43 R

OTHER PUBLICATIONS

Dendenkosha, K.; Magnetic Device, Japanese Publication, No. 35595/70, Nov. 13, 1970.

Middelhoek, S.; Magnetic Field Measurement, IBM Tech. Bull., Vol. 4, No. 6, Nov. 1961, pp. 42–43.

Primary Examiner—Robert J. Corcoran

[57] ABSTRACT

This invention relates to a flux detection device in which using the principle that a flux detection element using plated wire of uni-axial magnetic anisotropic characteristics with a coil thereon, if an exciting signal of predetermined frequency $f$ is applied to the core conductor of said flux detection element to produce a magnetic field less than the anisotropic field, the coil provides a threshold level responsive output signal of frequency $2f$, only when an external magnetic field applied to said flux detection element exceeds a predetermined value. The phase of the output signal of frequency $2f$ obtained at said coil corresponds to the polarity of the external magnetic field applied to said flux detection element. Said flux detection device has many applications, some of which are detection and measurement of magnetic fields, signal conversion from mechanical displacement to an electrical signal using a magnetic field, and ternary valued control system.

7 Claims, 15 Drawing Figures

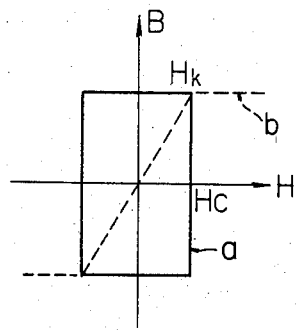
Fig. 1
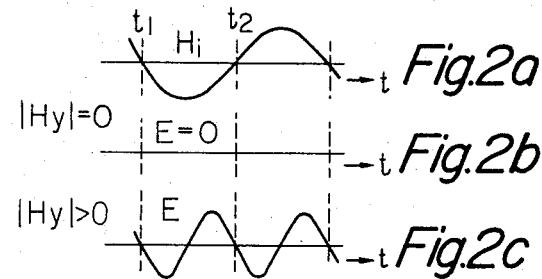
Fig. 2a
Fig. 2b
Fig. 2c
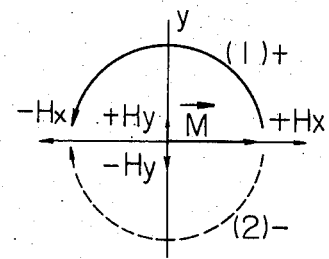
Fig. 3A
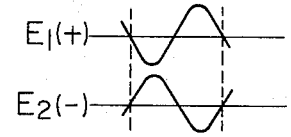
Fig. 3B
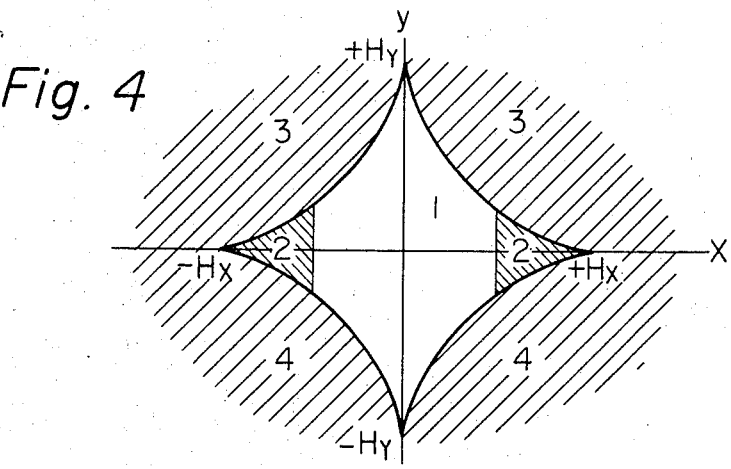
Fig. 4

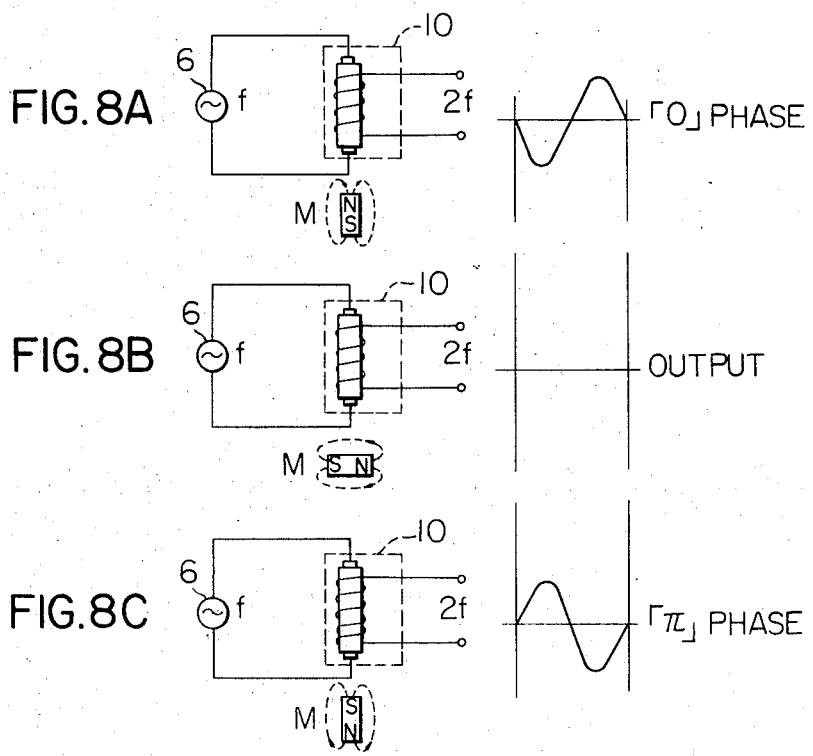
FIG. 8A  "0" PHASE
FIG. 8B  OUTPUT
FIG. 8C  "π" PHASE
Fig. 9
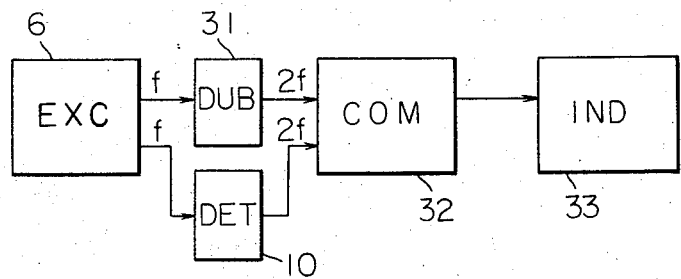

NON-LINEAR FLUX DETECTION DEVICE UTILIZING MAGNETIC THIN FILM

This invention relates to a flux detection device in which using the principle that a flux detection element using plated wire of uni-axial magnetic anisotropic characteristics with a coil thereon, if an exciting signal of predetermined frequency $f$ is applied to the core conductor of said flux detection element to produce a magnetic field less than anisotropic field, the coil provides a threshold level response output signal of frequency $2f$, only when an external magnetic field applied to said flux detection element exceeds a predetermined value. The phase of the output signal of frequency $2f$ obtained at said coil corresponds to the polarity of the external magnetic field applied to said flux detection element.

That is to say, the present invention depends on the principle of parameteric excitation in which an excitation signal of frequency $f$ is applied to a circuit where inductance is changed at a frequency of $2f$, and which produces output signals of frequency $2f$. The phase of said output signal is $(0)$ or $(\pi)$. Said flux detection device has many applications, some of which are detection and measurement of magnetic fields signal conversion from mechanical displacement to an electrical signal using a magnetic field, and three level valued control system.

The object of the present invention is to provide a flux detection device which has appropriate sensitivity, is structurally simple and can be applied to a switching element which operates without being effected by external magnetic noise.

Another object of the present invention is to provide a flux detection device which produces an electrical signal according to a mechanical displacement which causes a change of magnetic flux.

Still another object of the present invention is to provide a flux detection device which can be employed as a non-contact switch or a back-contact switch.

A still further object of the present invention is to provide a flux detection device which can be applied to a three level valued control system which operates according to the presence and polarity of a magnetic flux.

A flux detection device according to the present invention to perform the above objectives comprises at least one flux detection element using plated wire with uni-axial magnetic anisotropy with a coil wound thereon, an oscillating means which is connected to said plated wire and is arranged to apply a predetermined frequency $f$ to induce a magnetic field less than the anisotropic field in said plated wire, and means connected to said coil and arranged to process a signal of frequency $2f$ induced in said coil according to the existence and polarity of the external magnetic field.

Further features and advantages of the present invention will be apparent from the ensuing description with reference to the accompanying drawings to which, however, the scope of the invention is in no way limited.

FIG. 1 shows the hysteresis characteristics of a ferromagnetic thin film having the uni-axial anisotropy;

FIGS. 2a – 2c show the wave forms of the magnetic field and output voltage;

Figure 5A:
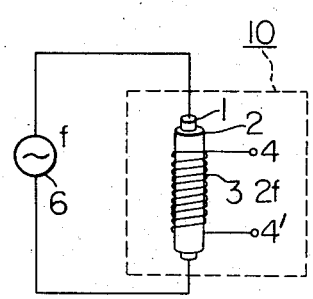
Figure 5B:
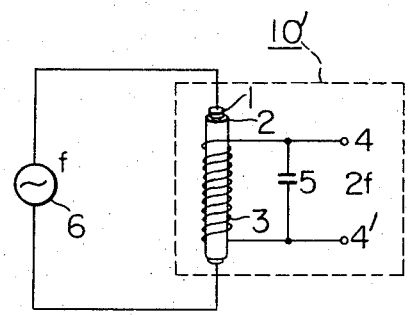
Figure 6:
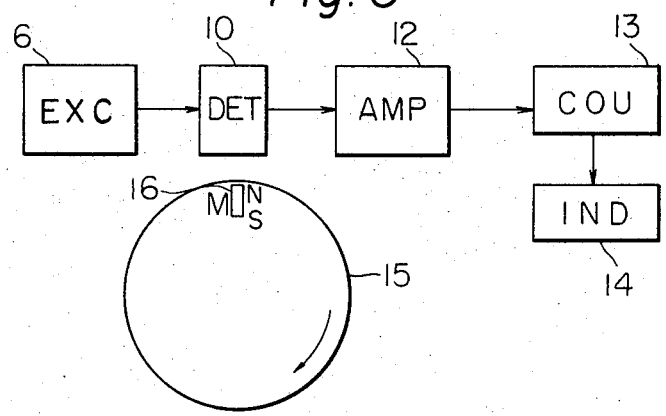
Figure 7:
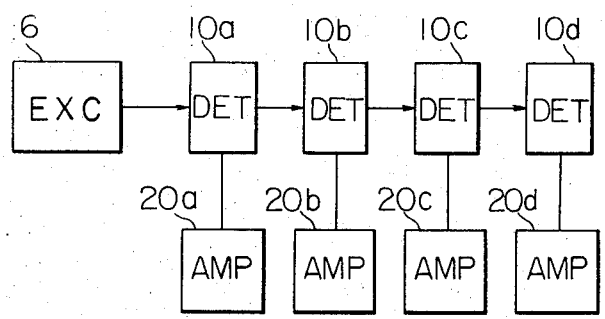

FIG. 3A and FIG. 3B explain the reversal of magnetization;

FIG. 4 is an asteroid curve showing the boundary of magnetic reversal;

FIG. 5A is a circuit diagram of a flux detection element according to the present invention;

FIG. 5B is another embodiment of a circuit diagram of a flux detection element according to the present invention;

FIG. 6 is a block diagram of one embodiment showing a binary control system according to the present invention;

FIG. 7 is a block diagram of another embodiment showing a binary control system according to the present invention;

FIG. 8($a$) – ($c$) are diagrams explaining the principle of ternary value system, and FIG. 9 is a block diagram of one embodiment of ternary valued control system according to the present invention.

First, the principle of this invention will be explained in reference to FIG. 1, FIG. 2, FIG. 3 and FIG. 4.

FIG. 1 shows the typical magnetization curve of a ferromagnetic plated wire with uni-axial magnetic anisotropy. In FIG. 1, $a$ is the magnetization curve along the easy magnetization axis, for instance, in circumferential direction, and $b$ is magnetization curve along the hard magnetization axis, for instance in the axial direction. For the sake of argument the direction of the easy magnetization axis is denoted by $x$, and the direction of the hard magnetization axis is denoted by $y$. The intensity of magnetization when magnetization saturation occurs, that is to say, the anisotropic magnetic field H$k$, is the same for the both directions. The coercive force H$c$ is usually slightly smaller than the anisotropic magnetic field H$k$. If the thin magnetic film of plated wire is so thin that the magnetic field lies only in a two dimensional flat plane, it is sufficient to analyze the situation as magnetization of only a two-dimensional plane. When the input exciting current flows through the plated wire, the magnetic field H$x$ appears in a plane of two-dimension as shown in FIG. 2A. The intensity of said magnetization should be low in order not to detect the output voltage of the winding, as shown in FIG. 2B, when there is no magnetic field applied along the $y$ axis of the plated wire. FIG. 2C shows the waveform of the output voltage E when a magnetic field is applied along the $y$ axis.

FIG. 3 shows the mechanism of magnetization in a two-dimensional plane. When the polarity of magnetic field H$x$ reverses or switches from positive to negative at time $t_1$ as shown in FIG. 2, the magnetic vector M goes either through path (1) or through path (2) in FIG. 3A. The path of the vector M is determined by the small magnetic field |H$y$| at times $t_1$ and $t_2$ in the direction of the $y$ axis. The output voltage at this time may be $E_1$ or $E_2$ of FIG. 3B according to the path of said vector M. Voltages $E_1$ and $E_2$ have the same amplitude and waveform, and have opposite polarities to each other.

FIG. 4 shows an asteroid curve which shows the relation between the turn over of magnetization and the intensity of each magnetic fields, H$x$ and H$y$, to be applied in the direction of easy axis and hard axis. In FIG. 4 when the alternate magnetic field |H$x$| in the direction of the $x$ axis is smaller than the anisotropic field |H$k$|, and the magnetic field in the direction of the $y$ axis is smaller than the predetermined value, the magnetization vector M is in the polarity of the area (1), and therefore, the magnetization does not switch. At this time is the magnetic field $|Hy|$, the intensity of which lies outside the boundary line in FIG. 4 and lies in the area (3) or (4) in FIG. 4, is applied to the plated wire in the direction of the y axis, the polarity of the magnetization of the plated wire switches according to the polarity of the magnetic field in the direction of the y axis and the output voltage of FIG. 3B is induced in the coil. When $|Hx|$ is equal to or a little smaller than $|Hk|$, that is to say, the intensity of the magnetic field is in the area (2) in FIG. 4, the polarity of the magnetization definitely switches due to the movement of the magnetic domain walls even though there is a very small magnetic field in the y direction. However, when the value of $|Hx|$ increases and becomes larger than the value of $|Hk|$, and when there is no magnetic field in the y direction, the phase of the output voltage becomes unstable, because area (3) or (4) is selected at random with stray magnetic field.

FIG. 5A and FIG. 5B are two embodiments of the circuit diagram of the present invention.

In FIG. 5A, the flux detection element is shown by reference number 10. The flux detection element 10 is comprised of a plated wire having a core conductor 1, the surface of which is covered with a thin film 2 by electrodeposition, and a coil 3 wound thereon. In a preferable embodiment of the present invention, permalloy is used for the magnetic thin film 2, which has an easy magnetization axis in the circumferential direction and a hard magnetization axis in the direction of the axis of said plated wire itself or which has a hard magnetization axis in the circumferential direction and an easy magnetization axis in the direction of the axis of said plated wire itself. The thickness of said thin film is, for instance, $1\mu$, the diameter of said core conductor 1 is 0.2 mm, and the number of turns of coil 3 is 60. Suppose that a current of predetermined amplitude and frequency, for instance 70 mA and 1 MHz, flows through core conductor 1 to produce a magnetic field less than the anisotropic field $Hk$ in the plated wire by the exciting means 6, and the plated wire is excited in area (1) of FIG. 4. At this time, the output signal induced between terminals 4 and 4' of coil 3 is zero if the external magnetic field in the longitudinal direction is smaller than the predetermined value. And when the external magnetic field exceeds said predetermined value, for instance 2 gauss, the output signal between terminals 4 and 4' of coil 3 appears suddenly. The frequency of the output signal is $2f-$ (2 MHz), and the phase of said output signal is (0) or ($\pi$) depending on the polarity of the external magnetic field as explained above in FIG. 3. Said output signal is called "threshold level responsive signal of frequency $2f$," since said output signal appears suddenly just when the external magnetic field exceeds the predetermined value.

FIG. 5B shows a circuit diagram of another embodiment of the present invention. In FIG. 5B, a flux detection device 10' has a capacitor 5 connected between the terminals 4 and 4' of coil 3. The capacitance of said capacitor 5 is determined so that the resonant circuit comprising said capacitor 5 and a coil 3 resonates at frequency $2f$. In the embodiment of FIG. 5B, a large amplitude of output voltage is provided, for instance 0.3 volts, between terminals 4 and 4'.

The flux detection device according to the present invention can be used as a binary logic element. FIG. 6 shows the block diagram of one embodiment of the present invention applied to the detection of the number of revolutions using said logic element. In FIG. 6, magnet (M) 16 is provided near the circumference of a rotary disk 15 so that a steady D.C. magnetic field is applied in the direction of the longitudinal direction of said detection element (DET) 10. The output signal induced in coil 3 by the magnetic field of magnet (M) 16 is applied to an amplifier (AMP) 12, the output of which is applied to a counter (COU) 13 after being rectified. The output of said counter (COU) 13 is applied to an indicator (IND) 14, which indicates the number of revolutions of said disk 15. Further, the construction of FIG. 6 can be used as the automatic reading of a meter by sending the signal indicated at indicater (IND) 14 to a remote processing system by data communication lines.

FIG. 7 is another embodiment of the present invention using a plurality of the detection elements 10 or 10' of FIG. 5A or FIG. 5B. In FIG. 7, core conductors of magnetic plated wire 10a, 10b, 10c and 10d are connected in series, and said core conductors are excited simultaneously by a single exciting means 6. The output signal of each detection element induced in coil 3 is amplified by respective amplifier (AMP) 20a, 20b, 20c or 20d. The embodiment of FIG. 7 can be used as a non-contact switch. The embodiment of FIG. 7 can also be used as a back contact switch if the steady D.C. magnetic field in the longitudinal direction of detection element 10 as shown in FIG. 5 is applied as a bias field in advance, and an additional magnetic field of opposite direction and equal intensity as said bias field is applied. In this case some output voltage is normally provided and said voltage becomes zero when the additional field is applied.

A flux detection device according to this invention can be used as a three level valued element by providing a phase detection means which compares the double frequency output from the doubler and the detector. FIG. 8A - FIG. 8C show the principle of said three level valued element. Said three level valued element has three kinds of output signals, (0) phase, ($\pi$) phase, and no voltage according to the three values of three level valued control. For instance signal $E_1$ (+) defines (0) phase and signal $E_2(-)$ defines ($\pi$) phase in FIG. 3B. Suppose a bar magnet M is used for the external magnetic field shown in FIG. 8A - FIG. 8C. FIG. 8A shows that the output signal of (0) phase is obtained at coil 3 when the north pole of a magnet M is in the longitudinal direction, FIG. 8B shows that the output voltage at coil 3 is zero when there is no magnetic field in the longitudinal direction, and FIG. 8C shows that output signal of ($\pi$) phase is obtained at coil 3 when the south pole of magnet M is in the longitudinal direction.

FIG. 9 shows the discrimination between (0) phase and ($\pi$) phase. In FIG. 9, a doubler (DUB) 31 connected to the output of exciter 6 provides a reference signal of standard phase and frequency $2f$. The comparison circuit (COM) 32 detects the amplitude of output of doubler 31 and compares the phase between the reference phase of said doubler (DUB) 31 and the variable phase of an element 10, and provides three kinds of output signals according to the three conditions of the magnetic field in the longitudinal direction of element 10. An indicator (IND) 33 indicates one of the three values by a visual signal or an electrical signal. Thus a three level valued system of this invention operates according to the presence and its polarity of the magnetic field in the longitudinal direction. Said three level valued system can be applied, for instance, to an automatic balancing device.

As explained above, it should be understood that a flux detection device according to the present invention is not affected by extraneous and small magnetic fields, and therefore, the element need not be shielded magnetically, because area (1) of FIG. 4 is used. Further, the construction and processing means are simple and the cost is low because output voltage is directly detected instead of phase as in the prior art, and it should be noted that heat dissipation and power consumption according to energy loss by the magnetic material are low, as element 10 does not provide continuous output voltage and needs only a small exciting current. As the principle of this invention depends on the characteristics of magnetic material as explained above, this invention provides a flux detection device of high reliability and long life.

A flux detection device according to the present invention can be used, as a detecting or switching element of low sensitivity, not only to said binary or three level valued system, but also to ordinary switching systems in general.

What we claim is:

1. A non linear flux detection device utilizing a thin magnetic film comprising:
   a. a flux detection element comprising a wire, a layer of magnetic material of uni-axial magnetic anisotropic characteristics plated on said wire, and a coil wound on said layer;
   b. said layer of magnetic material having a hard magnetization axis in the direction of its axis and an easy magnetization axis in the circumferential direction;
   c. an exciting means connected to said plated wire for applying thereto a predetermined signal of frequency $f$ having a maximum amplitude sufficient only to produce a magnetic field less than the anisotropic magnetic field in said plated wire, and
   d. a detecting means connected to the output of said coil and arranged to detect the presence of an amplitude of a threshold level responsive signal of frequency $2f$ which appears suddenly at the output of said coil when the strength of an external magnetic field in the direction of the hard magnetization axis exceeds a predetermined threshold level, the threshold level responsive signal remaining until the external magnetic field drops below said predetermined threshold level, said threshold level being greater than zero.

2. A non linear flux detection device utilizing a magnetic thin film according to claim 1, further comprising a capacitor connected in parallel with the output of said coil, the capacitance of said capacitor being selected to resonate at a frequency $2f$ with inductance of said coil for providing an easy parametric excitation.

3. A non linear flux detection device utilizing a thin magnetic film according to claim 1 wherein the thickness of said film is about 1 $\mu$, the diameter of said wire is about 0.2 mm, the number of turns of said coil is 60 and the amplitude of said signal of frequency $f$ is about 70 mA.

4. A non linear flux detection device utilizing a thin magnetic film according to claim 1, wherein said detecting means for detecting the presence of said signal of frequency $2f$ comprises:
   a. an amplifier connected to the output of said coil;
   b. a counter connected to the output of said amplifier;
   c. said counter being arranged to count the number of times that an external magnetic field having an amplitude exceeding said threshold level is applied to said flux detection element.

5. A non linear flux detection device utilizing a thin magnetic film according to claim 1, comprising:
   a. a plurality of said elements having the wires thereof electrically connected in series with each other;
   b. said exciting means being connected to supply an exciting signal of frequency $f$ simultaneously to the wires of said series connected elements;
   c. A separate amplifier provided for each of said flux detection elements and connected to the output of the coil wound on each plated wire of each respective element, for detecting the presence of a plurality of independent external fields.

6. A non linear flux detection device utilizing a thin magnetic film according to claim 1 for use as a three level valued control system, wherein said detecting means for detecting the presence of a signal of frequency $2f$ comprises:
   a. a doubler connected to the output of said exciting means and arranged to produce an output signal of reference phase and frequency $2f$;
   b. a comparison circuit means for comparing the phase between the output signal of said doubler and the output signal of said coil of said flux detection element;
   c. said comparison circuit being further arranged to detect the amplitude of the output signal of said flux detection element.

7. A method for detecting magnetic flux comprising the steps of applying a predetermined signal of frequency $f$ to a plated wire of uni-axial magnetic anisotropic characteristics with a coil wound thereon, the plated wire having a hard magnetization axis in an axial direction and an easy magnetization axis in the circumferential direction, the maximum amplitude of the predetermined signal of frequency $f$ being sufficient only to produce a magnetic flux less than the anisotropic magnetic field in said plated wire, placing said plated wire and said coil into the field to be measured, detecting a signal of frequency $2f$ produced at the output of said coil and appearing suddenly when the strength of the external magnetic field exceeds a predetermined threshold level.

* * * * *